United States Patent
Rosengren et al.

(10) Patent No.: US 6,741,617 B2
(45) Date of Patent: *May 25, 2004

(54) ARRANGEMENT FOR DECODING DIGITAL VIDEO SIGNALS

(75) Inventors: Jürgen F. Rosengren, Eindhoven (NL); Ronald W. J. J. Saeijs, Eindhoven (NL)

(73) Assignee: Koninklijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/459,631

(22) Filed: Dec. 13, 1999

(65) Prior Publication Data

US 2002/0047914 A1 Apr. 25, 2002

Related U.S. Application Data

(63) Continuation of application No. 08/909,144, filed on Aug. 11, 1997, now Pat. No. 6,041,068, which is a continuation of application No. 08/422,378, filed on Apr. 14, 1995, now abandoned.

(51) Int. Cl.[7] .............. H04J 3/04; H04J 3/02; H04N 5/917

(52) U.S. Cl. .............. 370/536; 386/109; 348/385.1; 348/565; 370/542

(58) Field of Search .............. 370/532, 535–7, 370/542, 521; 348/384–7, 423, 439, 564–8, 384.1, 385.1, 388.1, 389.1, 423.1, 563–9; 386/37, 40, 68, 123, 124, 109, 111; 375/240, 240.1

(56) References Cited

U.S. PATENT DOCUMENTS

| | | | | |
|---|---|---|---|---|
| 5,377,051 A | * | 12/1994 | Lane et al. | 360/33.1 |
| 5,621,456 A | * | 4/1997 | Florin et al. | 348/7 |
| 5,867,223 A | * | 2/1999 | Schindler et al. | 348/552 |
| 6,025,878 A | * | 2/2000 | Boyce et al. | 348/402 |

* cited by examiner

Primary Examiner—David Vincent
(74) Attorney, Agent, or Firm—Laurie E. Gathman (57) ABSTRACT

The invention relates to an arrangement for deriving an ancillary signal from a compressed digital video signal (e.g. MPEG). The ancillary signal comprises selected parts of the main signal, for example, the DC coefficients of I-pictures, or the unscrambled parts. The ancillary signal thus obtained can be used for display in a (multi-) picture-in-picture television receiver, or as an "appetizer" in order to encourage the user to pay a subscription fee. The ancillary signal can separately be recorded in digital video recorders so as to assist the user in finding the beginning of a scrambled program on tape. The ancillary signal can also be generated at the transmitter end and transmitted at a low bit rate. A decoder for decoding such an ancillary signal is considerably simpler and less expensive than a full-spec MPEG decoder.

20 Claims, 5 Drawing Sheets

ARRANGEMENT FOR DECODING DIGITAL VIDEO SIGNALS

CROSS REFERENCE TO RELATED APPLICATIONS

This is a continuation of application Ser. No. 08/909,144 now U.S. Pat. No. 6,041,068 filed on Aug. 11, 1997, which is a continuation of Ser. No. 08/422,378, filed on Apr. 14, 1995.

FIELD OF THE INVENTION

The invention relates to an arrangement for decoding a digital video signal encoded as an MPEG elementary video stream. The invention also relates to television receivers, video recorders, and transmitters comprising such an arrangement.

BACKGROUND OF THE INVENTION

An arrangement for decoding a digital video signal is disclosed in "ISO/IEC CD 13818: Information technology—Generic coding of moving pictures and associated audio information", Dec. 1, 1993, further referred to as the MPEG standard. Part 1 of this standard relates to the system aspects of digital transmission, Part 2 relates more particularly to video encoding.

MPEG2 is a packet-based time multiplex system. Data is transmitted in transport packets. Each transport packet contains data from exactly one elementary stream with which it is associated by means of its packet identifier. Examples of elementary streams are video streams, audio streams, and data streams. One or more elementary streams sharing the same time base make up a program. A typical program might consist of one video stream and one audio stream. One or more programs constitute a transport stream.

OBJECT AND SUMMARY OF THE INVENTION

It is, inter alia, an object of the invention to provide an arrangement which renders it possible to implement new and known features in a more cost-effective manner.

According to the invention, the arrangement for decoding an MPEG elementary video stream is characterized in that the arrangement comprises means for decoding selected parts of said elementary stream, and means for rearranging said selected parts so as to constitute an ancillary video signal. As only selected parts of the elementary signal are decoded, the arrangement is considerably simpler and less expensive than a full-spec MPEG decoder.

As is known in the prior art, an MPEG encoded video signal includes autonomously encoded pictures (I-pictures) and predictively encoded pictures (P-pictures and B-pictures). The selected parts constituting the ancillary signal may be, for example, the I-pictures. In that case, the arrangement is simple because motion compensation circuitry and a large amount of memory can be dispensed with. An embodiment of the arrangement is characterized in that said selected parts are the DC coefficients of autonomously encoded pictures. Such an arrangement is extremely simple.

MPEG also allows parts of the signal to be scrambled, whereas other parts remain unscrambled. A further embodiment of the arrangement is characterized in that the selected parts are the unscrambled parts of the video signal.

The arrangement provides an ancillary video signal having a lower quality than the main signal from which it is derived. Various applications thereof are conceivable. A picture-in-picture television receiver, for example, may comprise the arrangement so as to obtain the ancillary signal for display as the picture-in-picture. In a multi-picture-in-picture television receiver, the arrangement may be used to decode a plurality of elementary video streams, and simultaneously display the respective ancillary signals as a mosaic picture. In a video recorder, the arrangement may be used to obtain a low-quality version of a video signal for separate recording so as to be reproduced at higher playback speeds. If the ancillary signal comprises the unscrambled parts of a scrambled main signal, it allows a video program to be viewed free of charge but at a low quality. The ancillary signal thus acts as an "appetizer", attracting the viewer's attention to the presence and contents of the main signal. When recorded simultaneously with the main signal on a digital video recorder, the ancillary signal also assists the user in finding the beginning of a scrambled program on tape.

The arrangement may also be used in transmitters. According to the invention, a transmitter for transmitting a digital video signal encoded as an MPEG elementary video stream, is characterized in that the transmitter comprises the arrangement for decoding said video signal, and means for transmitting the ancillary video signal as a further elementary video stream. The MPEG standard allows a program to comprise more than one elementary video stream. The ancillary video signal thus transmitted may serve the purposes mentioned before. For decoding the ancillary signal, a simple decoder is adequate. The transmitted ancillary signal requires only a low bitrate.

DESCRIPTION OF EMBODIMENTS

Figure 1:
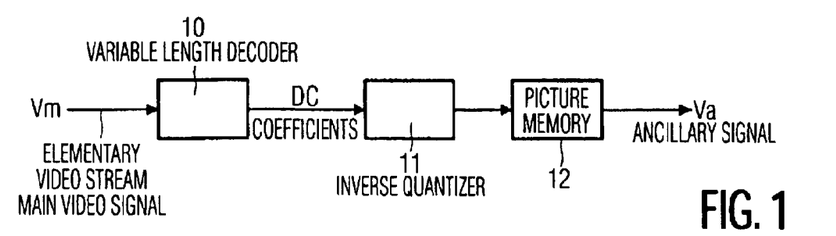
FIG. 1 shows a diagram of an arrangement for carrying out the method according to the invention.

FIG. 1 shows a diagram of an arrangement according to the invention. The arrangement comprises a variable-length decoder 10 (hereinafter VLD), an inverse quantizer 11 and a picture memory 12. The arrangement receives an elementary video stream representing a main video signal Vm and derives therefrom an ancillary video signal Va. The main video signal Vm is assumed to have been encoded according to "ISO/IEC CD 13818-2: Information technology—Generic coding of moving pictures and associated audio information—Part 2: Video", Dec. 1, 1993, also referred to as the MPEG2 video coding standard. For understanding the invention, it suffices to mention that the main signal Vm includes autonomously encoded pictures (I-pictures) and predictively encoded pictures (P- and B-pictures). Each picture has been divided into blocks of 8*8 pixels and each block has been transformed to spectral coefficients. The relevant coefficients are subjected to a combination of Huffman coding and runlength coding. Four luminance blocks and associated chrominance blocks constitute a macroblock and a plurality of macroblocks constitute a slice. The first (DC) coefficient of blocks of I-pictures represents the average luminance and chrominance of an 8*8 pixel block. The bitstream Vm further includes overhead information such as syncwords, picture type parameters, and the like.

Figure 2:
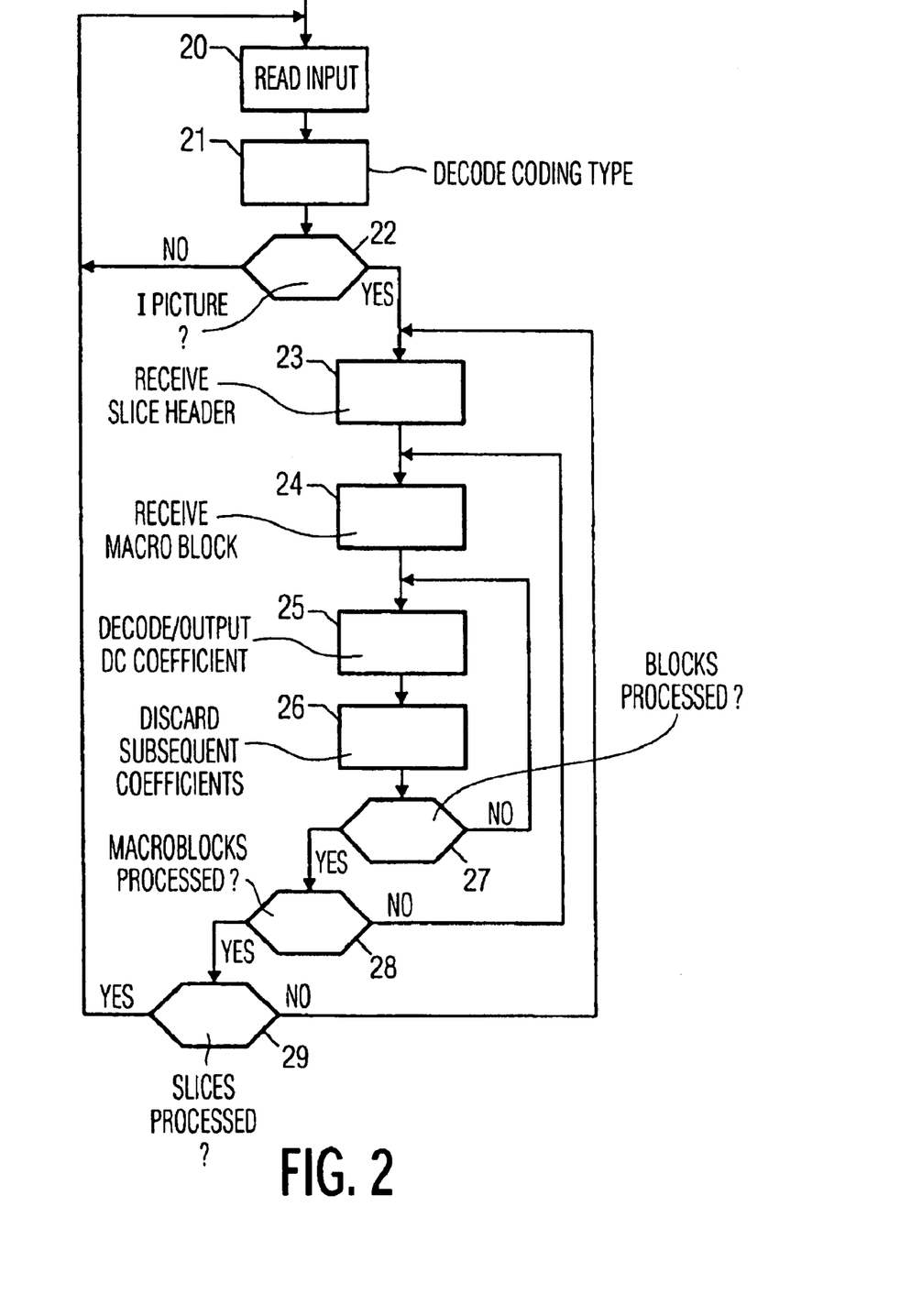
FIG. 2 shows a flow chart illustrating the operation of the arrangement shown in FIG. 1.

The operation of the arrangement shown in FIG. 1 will now be elucidated with reference to a flow chart shown in FIG. 2. In a first step 20, the VLD reads the input bitstream and discards all data until a picture start code is encountered. Data defining a picture is now being received. In a step 21, the picture coding type accommodated in the picture header is decoded. In a step 22, it is established whether said picture coding type indicates that an I-picture is being received. If that is not the case, the VLD returns to step 20 to await the next picture start code. If the picture is an I-picture, the VLD successively awaits the reception of a slice header (step 23) and the reception of a macroblock (step 24).

In a step 25, the VLD decodes and outputs the DC coefficient of a block within the current macroblock. In a step 26, the subsequent coefficients up to the detection of an end-of-block code are discarded. In a step 27, it is ascertained whether all blocks of a macroblock have been processed. As long as that is not the case, the VLD returns to step 25. In a step 28, it is ascertained whether all macroblocks of a slice have been processed. As long as that is not the case, the VLD returns to step 24. Finally, it is ascertained in a step 29 whether all slices of the picture have been processed. As long as that is not the case, the VLD returns to step 23. If all slices have been processed, the VLD returns to step 20 in order to search the next I-picture in the bitstream.

The VLD thus extracts the DC coefficients of I-pictures from the input bitstream. As shown in FIG. 1, said coefficients are supplied to the inverse quantizer 11 and then stored in memory 12. Each DC coefficient represents the average luminance and chrominance value of an 8*8 pixel block of the main video I-pictures. The ancillary video signal is obtained by reading out said memory with an appropriate time basis.

In an alternative embodiment, steps 25 and 26 are modified so as to decode all coefficients of a block. In that case, the ancillary signal comprises I-pictures and is a temporally reduced version of the main signal.

Figure 3:
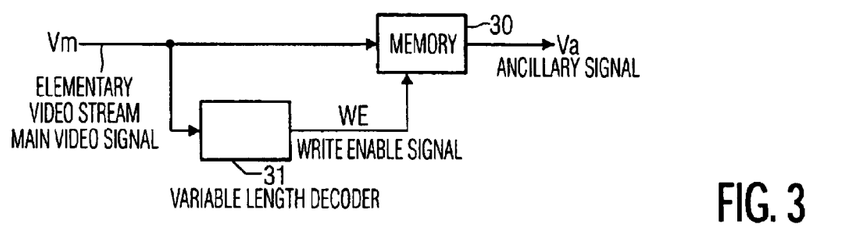
FIG. 3 shows a diagram of another embodiment of the arrangement for carrying out the method according to the invention.

FIG. 3 shows a diagram of another embodiment of the arrangement for carrying out the method according to the invention. In this arrangement the bitstream representing the main video signal Vm is supplied to a memory 30 and variable-length decoder 31. The variable-length decoder analyses the bitstream and generates a write enable signal WE so as to determine which part of the bitstream is stored in the memory. The memory is read out at a lower bitrate so as to constitute an elementary video stream representing the ancillary video signal Va.

Figure 4:
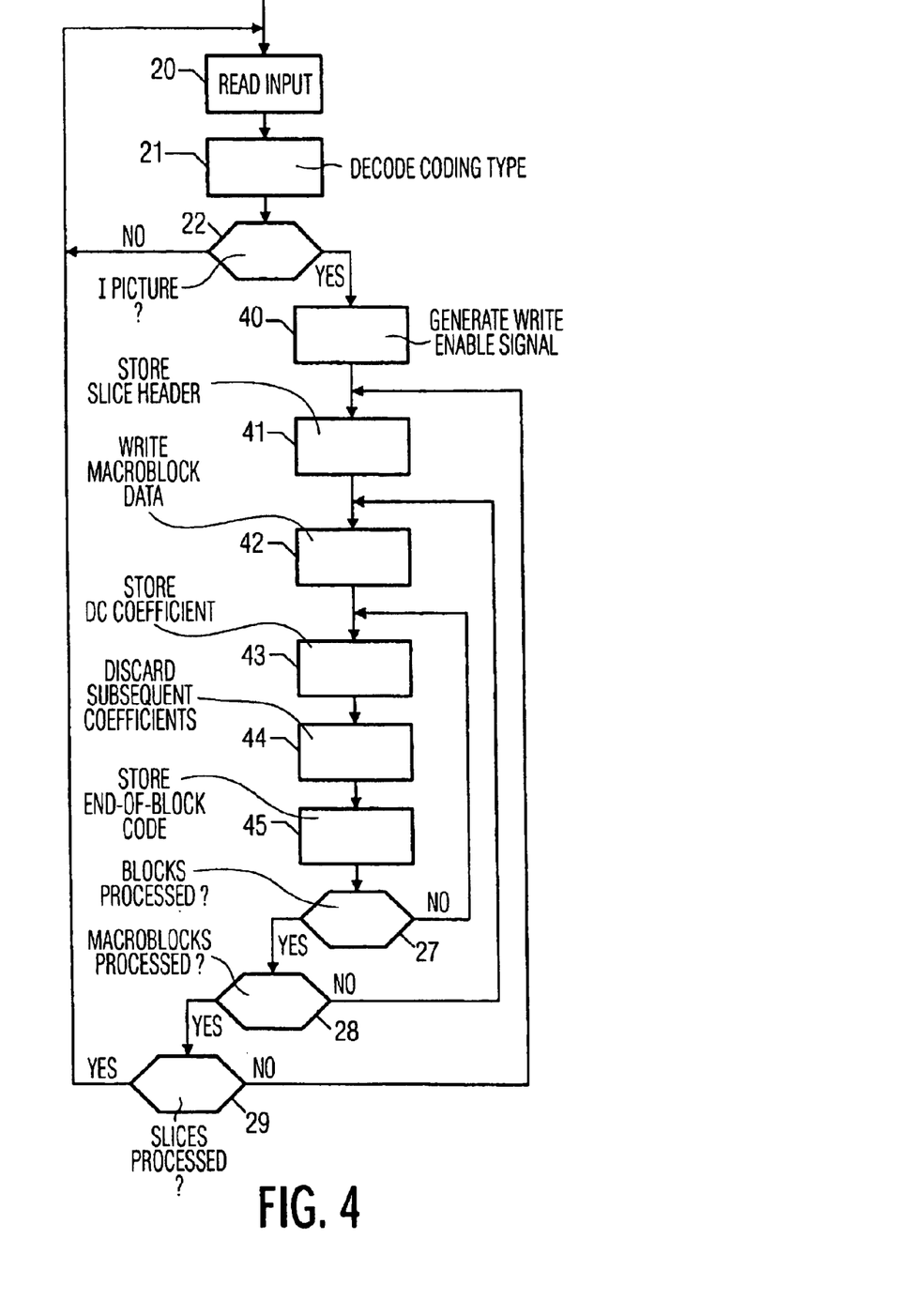
FIG. 4 shows a flow chart illustrating the operation of the arrangement shown in FIG. 3.

The operation of the arrangement shown in FIG. 3 will now be elucidated with reference to a flow chart shown in FIG. 4. The steps 20-22 are the same as the corresponding steps shown in FIG. 2. Thus, in the step 20, the VLD reads the input bitstream and discards all data until a picture start code is encountered. In the step 21, the picture coding type accommodated in the picture header is decoded. In the step 22, it is ascertained whether said picture coding type indicates that an I-picture is being received. If that is not the case, the VLD returns to step 20 to await the next picture start code.

If the picture is an I-picture, a step 40 is performed in which the VLD allows the picture header to be kept in the memory by generating an appropriate write enable signal. In a step 41, the slice header is received and stored in the memory. A macroblock is now being received. In a step 42, all macroblock data up to the first block is written in the memory.

In a step 43, the VLD detects the presence of a DC coefficient of a block within the current macroblock and allows this coefficient to be stored in the memory. In a step 44, the subsequent coefficients of the block up to the detection of an end-of-block code are discarded. The VLD refrains from generating the write enable signal while said coefficients are being received. In a step 45, the end-of-block code is stored in the memory. Steps 27–29 are the same as the corresponding steps shown in FIG. 2. They facilitate the check of whether or not the current I-picture has been processed.

The arrangement shown in FIG. 3 thus copies the main bitstream Vm in memory 30, thereby ignoring the P- and B-pictures as well as the non-DC-coefficients of I-pictures. The ancillary video signal Va obtained by reading out the memory 30 is the same as that created by the arrangement shown in FIG. 1 but is now suitable for transmission as a further elementary signal. It is a low bitrate replica of the main signal, with a reduced spatial and temporal resolution.

Figure 5:
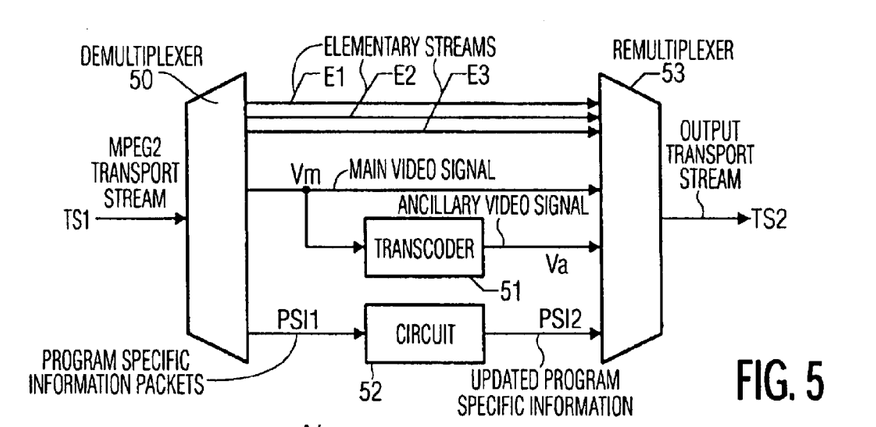
FIG. 5 shows a diagram of an arrangement for transmitting the ancillary video signal as an elementary MPEG bitstream of the same program as the main video signal.

FIG. 5 shows a diagram of a transmitter according to the invention. The transmitter comprises a demultiplexer 50, a transcoder 51, a circuit 52 for regenerating program specific information, and a remultiplexer 53. The arrangement receives a packetized transport stream TS1. Said transport stream comprises a plurality of audiovisual programs, each program being formed by one or more elementary streams (e.g. video, audio, data). The transport stream also comprises packets accommodating program-specific information (PSI). PSI packets specify which programs are available, as well as how many and which elementary streams each program comprises. A detailed description of transport streams and program-specific information can be found in "ISO/IEC CD 13818-1: Information technology—Generic coding of moving pictures and associated audio information—Part 1: Systems", Dec. 1, 1993, also known as the MPEG2 systems standard.

Demultiplexer 50 selects an elementary video stream Vm from which an ancillary signal Va is to be derived. Other elementary streams E1,E2,E3 remain unprocessed in this embodiment. The main video signal Vm is applied to transcoder 51 which may take the form of the arrangement shown in FIG. 3, already discussed. The transcoder outputs an ancillary video signal Va in the form of a further elementary stream. Demultiplexer 50 also extracts program-specific information packets PSI1 from the transport stream TS1 and applies them to circuit 52. This circuit updates the program-specific information so as to specify that ancillary signal Va is present in output transport stream TS2. The circuit further specifies that Va is associated with the same audiovisual program as the main elementary stream Va from which it has been derived. The updated program-specific information PSI2 and the ancillary elementary stream Va are then added by remultiplexer 53 to the original elementary streams and retransmitted as a new transport stream TS2.

Figure 6:
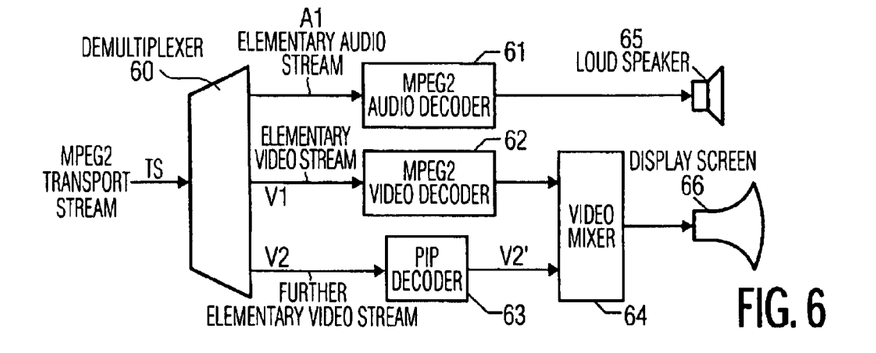
FIG. 6 shows a diagram of a digital picture-in-picture television receiver according to the invention.

FIG. 6 shows a diagram of a digital picture-in-picture (PIP) television receiver according to the invention. The receiver comprises a demultiplexer 60, an MPEG2 audio decoder 61, an MPEG2 video decoder 62, a PIP-decoder 63, and a video mixer 64. The demultiplexer 60 receives an MPEG2 transport stream TS and extracts therefrom an elementary audio stream A1 and an elementary video stream V1 associated with a desired program. The elementary streams A1 and V1 are decoded by audio decoder 61 and video decoder 62, respectively. The decoded audio signal is applied to a loudspeaker 65. The demultiplexer further extracts from the transport stream TS a further elementary video stream V2 associated with a different program which is to be displayed as picture-in-picture. The further elementary stream V2 is decoded by PIP-decoder 63 and converted into a signal V2' with a reduced size and temporal resolution. Both video signals V1 and V2' are mixed in video mixer 64 and displayed on a display screen 66.

In a first embodiment of the PIP-receiver, elementary stream V2 defines a full-size, full-resolution MPEG-encoded video signal, including I, P and B-pictures. In this embodiment, PIP-decoder 63 takes the form of the circuit shown in FIG. 1, already discussed. In a second embodiment of the PIP-receiver, the elementary stream V2 is assumed to be an ancillary video stream transmitted by an arrangement as shown in FIG. 5. As explained with reference to FIG. 5, the elementary stream V2 comprises DC-coefficients of I-pictures only. In this embodiment, PIP-decoder 63 also takes the form of the circuit shown in FIG. 1, already discussed. However, the variable-length decoder (10 in FIG. 1) is simpler because various types of overhead data are absent in the bitstream and thus do not need to be processed.

Figure 7A:
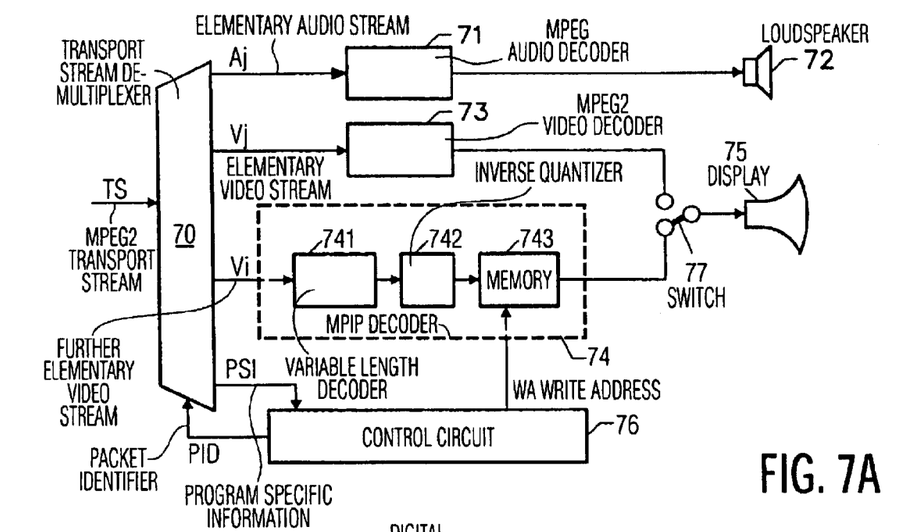
FIG. 7A shows a diagram of a digital multi-picture-in-picture television receiver according to the invention.

FIG. 7A shows a diagram of a digital multi-picture-in-picture (MPIP) television receiver according to the invention. The receiver comprises a transport stream demultiplexer 70, an MPEG2 audio decoder 71, a loudspeaker 72, an MPEG2 video decoder 73, a MPIP-decoder 74, a display screen 75 and a control circuit 76. The demultiplexer 70 receives an MPEG2 transport stream TS and extracts therefrom an elementary audio stream Aj and an elementary video stream Vj, both associated with a program number j. The elementary streams Aj and Vj are decoded by audio decoder 71 and video decoder 73, respectively. The decoded audio signal is applied to loudspeaker 72. The decoded video signal is displayable, via a switch 77, on display screen 75. The demultiplexer further extracts from the transport stream TS a further elementary video stream Vi associated with a program i. The further elementary stream Vi may define a full-size, full-resolution MPEG-encoded video signal, including I, P and B-pictures. The further elementary video stream Vi may also be an ancillary video stream transmitted by an arrangement as shown in FIG. 5. In the latter case, the ancillary video signal comprises, as explained above, DC-coefficients of I-pictures only.

MPIP-decoder 74 is adapted to decode the ancillary signal Vi. The decoder comprises a variable-length decoder 741, an inverse quantizer 742 and a memory 743. The decoder has the same structure as the arrangement shown in FIG. 1. However, memory 743 now has a plurality of memory sections, addressed by a write address WA, each section having the capacity to store a respective small-size picture.

Figure 7B:
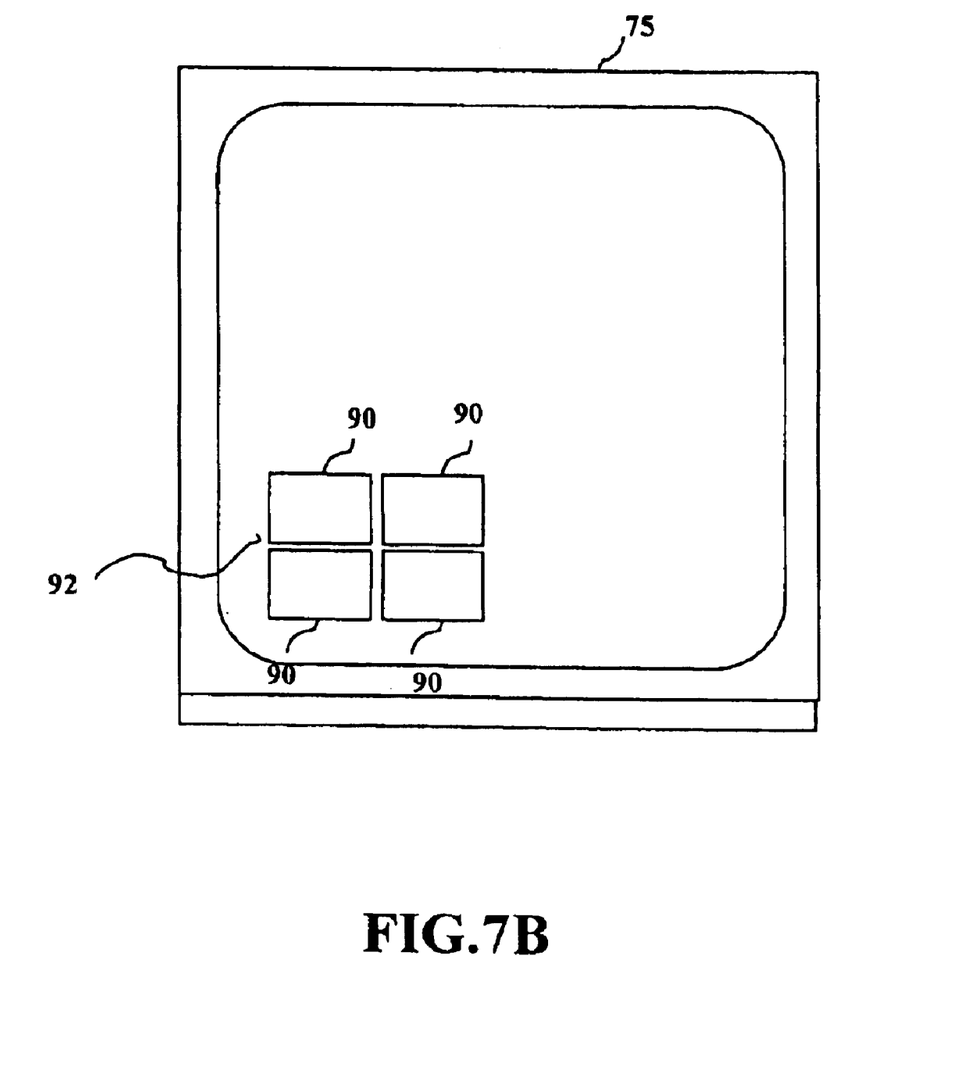
FIG. 7B shows a diagram of the mosaic picture displayed as MPIP.

In operation, control circuit 76 receives from demultiplexer 70 the transport packets accommodating program-specific information PSI. As already mentioned before, said packets specify which programs are available, as well as how many and which elementary streams each program comprises. The control circuit is adapted to read from the PSI-data, for each available program i, the packet identifier PID defining the transport packets conveying the ancillary video signal Vi associated therewith. For a plurality of different programs, the relevant PIDs are successively applied to the demultiplexer 70 so as to apply the associated ancillary video signal Vi to MPIP-decoder 74. Each decoded small-size picture is stored in a section of memory 743 under the control of the write address WA generated by control circuit 76. Now referring to FIG. 7B, the plurality of small-size pictures 90 together constitutes a mosaic video picture 92 which can be displayed under user control on display screen 75 via the switch 77 as shown in FIG. 7A.

Returning to FIG. 7A, upon user-selection of one of the displayed miniature pictures (e.g. by a cursor device not shown), the control circuit 76 converts the selected display screen position into the program number associated therewith, and controls demultiplexer 70 so as to select the audio stream Aj and video stream Vj associated with the selected program. The control circuit further controls switch 77 so as to display the selected program in full size and resolution on display screen 75 and to reproduce its sound via loudspeaker 72.

Figure 8A:
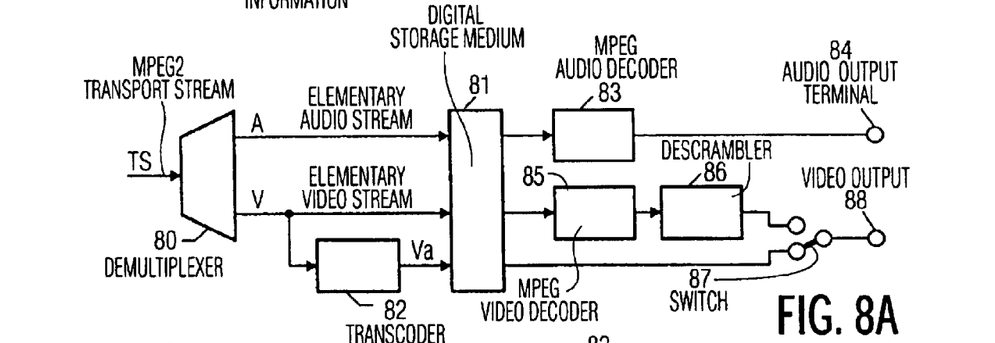
FIGS. 8A and 8B show embodiments of a digital video recorder according to the invention.
Figure 8B:
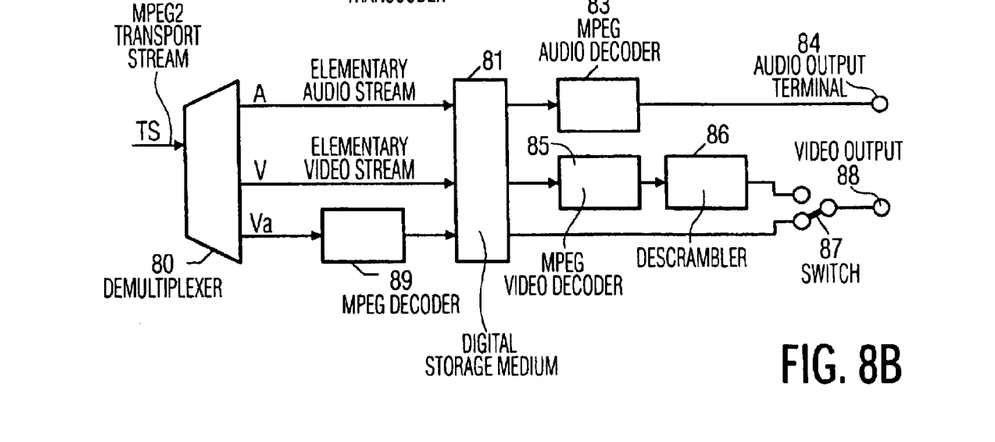

FIGS. 8A and 8B show two embodiments of a digital video recorder according to the invention. The recorder receives an MPEG2 transport stream TS and comprises a demultiplexer 80 to select therefrom an elementary audio stream A and an elementary video stream V. The elementary video stream is assumed to have been scrambled such that only the predictively encoded (P and B) pictures are scrambled. Both elementary streams are recorded on a digital storage medium 81.

In the embodiment shown in FIG. 8A, the video stream V is further applied to a transcoder 82 which may take the form as shown in FIG. 1. In the embodiment shown in FIG. 8B, the demultiplexer further selects an ancillary elementary stream Va, which is transmitted by an arrangement as shown in FIG. 5. The ancillary stream is applied to a "simple" MPEG decoder 89 as explained hereinbefore with reference to FIG. 6.

In both embodiments, the ancillary signal Va comprises the DC-coefficients of I-pictures of the same program as video signal V. This ancillary signal is separately recorded on storage medium 81. Upon normal playback, the recorded audio and video elementary streams A and V are decoded by MPEG2 audio decoder 83 and MPEG2 video decoder 85, respectively. The audio signal is applied to an audio output terminal 84. If the video signal has been scrambled, it can only be displayed when processed by a descrambler 86. The descrambler may take the form of a circuit which is activated only upon insertion of a smart card holding a sufficient amount of credit. These types of descramblers are known per se in the art. The decoded and descrambled video signal is then applied, via a switch 87, to a video output 88.

The video recorder can optionally output, via switch 87, the separately recorded ancillary signal Va. Said signal comprises DC-coefficients of I-pictures only and is thus not scrambled. Displaying this signal in reduced size or, after suitable upsampling (not shown), in full size but with reduced resolution, allows the user to scan the storage medium 81 for locating the start of a particular scrambled program without having yet to pay therefor. It is to be noted that in the embodiment of FIG. 8B the "simple" decoder 89 can also be located in the reproduction part (i.e. between storage medium 81 and switch 87) of the video recorder.

In summary, the invention relates to a method and arrangement for deriving an ancillary signal from a compressed digital video signal (e.g. MPEG). The DC coefficients of autonomously encoded pictures (I-pictures) are selected from the compressed signal. The ancillary signal thus obtained can be used for display in a (multi-) picture-in-picture television receiver. If the main signal is scrambled, the ancillary signal can be used as an "appetizer" in order to encourage the user to pay a subscription fee. The ancillary signal can separately be recorded in digital video recorders so as to assist the user in finding the beginning of a scrambled program on tape. The ancillary signal can also be generated at the transmitter end and transmitted at a low bit rate. A decoder for decoding such an ancillary signal is considerably simpler and less expensive than a full-spec MPEG decoder.

What is claimed is:

1. A method of receiving a first video signal representing a main picture and a second video signal representing a picture-in-picture, the second video signal being encoded as an elementary stream including both autonomously encoded pictures and predictively encoded pictures, comprising the step of:

receiving at a demultiplexer the first video signal and the second video signal; and selecting and decoding only said autonomously encoded pictures for display as the picture-in-picture.

2. A television receiver comprising:

a demultiplexer which receives a first video signal representing a main picture and a second video signal representing a picture-in-picture, the second video signal being encoded as an elementary stream including both autonomously encoded pictures and predictive encoded pictures; and a picture-in-picture (PIP) decoder which selects and decodes only said autonomously encoded pictures for display as the picture-in-picture.

3. A receiver as set forth in claim 2, wherein the autonomously encoded pictures comprise transform-coded blocks having respective DC coefficients and the PIP decoder which selects and decodes the autonomously encoded pictures is adapted to select and decode only said DC coefficients.

4. A method of receiving a plurality of video signals encoded as elementary video streams each of which includes both autonomously encoded pictures and predictively encoded pictures, comprising the steps of:

receiving at a demultiplexer the first video signal and the second video signal;

selecting and decoding said autonomously encoded pictures; and simultaneously providing for display the respective plurality of pictures as a mosaic picture.

5. A receiver comprising:

a demultiplexer which receives a plurality of video signals encoded as elementary video streams, each including both autonomously encoded pictures and predictively encoded pictures;

a multi-picture-in-picture (MPIP) decoder which selects and decodes only said autonomously encoded pictures included in said plurality of video signals; and a control device which simultaneously displays said selected and decoded said autonomously encoded pictures stored by said MPIP decoder as a mosaic picture;

wherein the autonomously encoded pictures comprise transform-coded blocks having respective DC coefficients and the MPIP decoder which selects and decodes the autonomously encoded pictures is adapted to select and decode only said DC coefficients.

6. A receiver as set forth in claim 5, further including a control device which selects one of the displayed plurality of pictures and is adapted to select, decode, and display the video signal from which the selected picture has been derived.

7. A television receiver comprising:

means for demultiplexing a first video signal representing a main picture and a second video signal representing a picture-in-picture, the second video signal being encoded as an elementary stream including both autonomously encoded pictures and predictively encoded pictures; and means for selecting and decoding only said autonomously encoded pictures for display as the picture-in-picture.

8. A receiver as set forth in claim 7, wherein the autonomously encoded pictures comprise transform-coded blocks having respective DC coefficients and the means for selecting and decoding the autonomously encoded pictures is adapted to select and decode only said DC coefficients.

9. A television receiver comprising:

means for demultiplexing a plurality of video signals encoded as elementary video streams, each including both autonomously encoded pictures and predictively encoded pictures;

means for selecting and decoding only said autonomously encoded pictures; and display means for simultaneously providing for display the respective plurality of pictures as a mosaic picture.

10. A receiver as set forth in claim 9, wherein the autonomously encoded pictures comprise transform-coded blocks having respective DC coefficients and the means for selecting and decoding the autonomously encoded pictures is adapted to select and decode only said DC coefficients.

11. A receiver as set forth in claim 9, further including user control means for selecting one of the displayed plurality of pictures and adapted to select, decode, and display the video signal from which the selected picture has been derived.

12. A television receiver comprising:

a demultiplexer which receives a plurality of video signals encoded as elementary video streams, each including both autonomously encoded pictures and predictively encoded pictures;

a multi-picture-in-picture decoder which selects and decodes only said autonomously encoded pictures; and a control device which simultaneously provides for display the respective plurality of pictures stored by said MPIP decoder as a mosaic picture.

13. A method as set forth in claim 1 further comprising the steps of:

receiving in a demultiplexer a plurality of video signals encoded as elementary video streams, wherein each of said plurality of video signals includes both autonomously encoded pictures and predictively encoded pictures;

selecting only said autonomously encoded pictures in a multi-picture-in-picture decoder;

decoding said autonomously encoded pictures in said multi-picture-in-picture decoder; and utilizing a control device to simultaneously display said plurality of pictures stored by said MPIP decoder as a mosaic picture.

14. A method as set forth in claim 13 further comprising the steps of:
  selecting one of said displayed plurality of pictures;
  decoding a video signal from said selected one of said displayed plurality of pictures; and
  displaying said video signal.

15. A method as set forth in claim 14 wherein said autonomously encoded pictures comprise transform-coded blocks having respective DC coefficients.

16. A method is set forth in claim 4 further comprising the steps of:
  receiving in a demultiplexer a plurality of video signals encoded as elementary video streams, wherein each of said plurality of video signals includes both autonomously encoded pictures and predictively encoded pictures;
  selecting only said autonomously encoded pictures in a multi-picture-in-picture decoder;
  decoding said autonomously encoded pictures in said multi-picture-in-picture decoder; and
  utilizing a control device to simultaneously display said plurality of pictures stored by said MPIP decoder as a mosaic picture.

17. A method as set forth in claim 16 further comprising the steps of:
  selecting one of said displayed plurality of pictures;
  decoding a video signal from said selected one of said displayed plurality of pictures; and
  displaying said video signal.

18. A method as set forth in claim 17 wherein said autonomously encoded pictures comprise transform-coded blocks having respective DC coefficients.

19. A television receiver as set forth in claim 12 wherein the autonomously encoded pictures comprise transform-coded blocks having respective DC coefficients and the multi-picture-in-picture decoder for selecting and decoding the autonomously encoded pictures is adapted to select and decode only said DC coefficients.

20. A television receiver as set forth in claim 13 further including user control means for selecting one of the displayed plurality of pictures and adapted to select, decode, and display the video signal from which the selected picture has been derived.

* * * * *